(12) United States Patent
Itabashi et al.

(10) Patent No.: US 8,340,864 B2
(45) Date of Patent: Dec. 25, 2012

(54) VEHICLE VIBRATION DAMPING CONTROL DEVICE

(75) Inventors: Kaiji Itabashi, Susono (JP); Takashi Saito, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 598 days.

(21) Appl. No.: 12/445,133

(22) PCT Filed: Oct. 17, 2007

(86) PCT No.: PCT/JP2007/070681
§ 371 (c)(1),
(2), (4) Date: Apr. 10, 2009

(87) PCT Pub. No.: WO2008/050782
PCT Pub. Date: May 2, 2008

(65) Prior Publication Data
US 2010/0241305 A1  Sep. 23, 2010

(30) Foreign Application Priority Data

Oct. 19, 2006 (JP) .................................. 2006-284642
Feb. 28, 2007 (JP) .................................. 2007-050849

(51) Int. Cl.
*B60G 17/00* (2006.01)
(52) U.S. Cl. .................. 701/37; 701/70; 701/84; 701/90
(58) Field of Classification Search .................... 701/37, 701/70, 84, 90
See application file for complete search history.

(56) References Cited

U.S. PATENT DOCUMENTS

| 4,871,039 | A | * | 10/1989 | Daido et al. | 180/446 |
|---|---|---|---|---|---|
| 5,137,105 | A | * | 8/1992 | Suzuki et al. | 180/197 |
| 5,183,127 | A | * | 2/1993 | Kageyama et al. | 180/197 |
| 5,275,474 | A | * | 1/1994 | Chin et al. | 303/148 |
| 5,406,486 | A | * | 4/1995 | Kamio et al. | 701/84 |
| 5,570,935 | A | * | 11/1996 | Monzaki | 303/155 |
| 5,711,024 | A | * | 1/1998 | Wanke | 701/82 |
| 5,748,474 | A | * | 5/1998 | Masuda et al. | 701/90 |
| 5,852,787 | A | * | 12/1998 | Fodor et al. | 701/6 |
| 5,868,474 | A |   | 2/1999 | Abe et al. |  |
| 6,498,975 | B1 | * | 12/2002 | Lee et al. | 701/69 |
| 6,654,675 | B2 | * | 11/2003 | Pedersen et al. | 701/36 |
| 2005/0049761 | A1 |   | 3/2005 | Kataoka et al. |  |

FOREIGN PATENT DOCUMENTS

| EP | 1 606 135 A | 10/2004 |
|---|---|---|
| EP | 1 632 382 A2 | 3/2006 |

(Continued)

*Primary Examiner* — Sarah B McPartlin
(74) *Attorney, Agent, or Firm* — Kenyon & Kenyon LLP (57) ABSTRACT

There is provided a vibration damping control device which suppresses pitching and bouncing vibration of a vehicle through a drive output control based on a wheel torque estimated value estimated with a wheel speed, etc., which device uses the estimated value of a wheel torque while taking into account conditions where no good estimation of the wheel torque is executable. The vibration damping control device comprises a wheel torque estimated value acquisition portion which acquires a wheel torque estimated value; and a driving torque control portion which controls a driving torque of the vehicle to suppress pitching or bouncing vibrational amplitudes based on the wheel torque estimated value, wherein the absolute value or the sign of the wheel torque estimated value is corrected in accordance with the degree of a slip of the wheel or the direction of movement of the vehicle. Further, there is provided a torque estimating device suitable for a vibration damping control and other running, motional or braking-driving force controls for a vehicle, etc.

21 Claims, 4 Drawing Sheets

FOREIGN PATENT DOCUMENTS

| | | |
|---|---|---|
| JP | 64-012961 A | 1/1989 |
| JP | 01-271617 A | 10/1989 |
| JP | 03-114912 A | 5/1991 |
| JP | 4-166632 A | 6/1992 |
| JP | 5-85342 A | 4/1993 |
| JP | 6-122332 A | 5/1994 |
| JP | 7-333239 A | 12/1995 |
| JP | 11-037872 A | 2/1999 |
| JP | 2001-349243 A | 12/2001 |
| JP | 2002-089326 A | 3/2002 |
| JP | 2004-168148 | 6/2004 |
| JP | 2005-069897 A | 3/2005 |
| JP | 2006-069472 A | 3/2006 |
| JP | 2006-177166 A | 7/2006 |
| JP | 2006-521241 A | 9/2006 |
| JP | 2006-281925 A | 10/2006 |

\* cited by examiner

Fig. 5

VEHICLE VIBRATION DAMPING CONTROL DEVICE

This is a 371 national phase application of PCT/JP2007/070681 filed 17 Oct. 2007, claiming priority to Japanese Patent Applications No. JP 2006-284642 filed 19 Oct. 2006, and No. JP 2007-050849 filed 28 Feb. 2007, respectively, the contents of which are incorporated herein by reference.

TECHNICAL FIELD

The present invention relates to a vibration damping control device of a vehicle, such as an automobile, more, particularly, to a vibration damping control device which controls a drive output (a driving force or a driving torque) of a vehicle so as to suppress vibration of a vehicle body, and to a device which estimates a wheel torque during the running of a vehicle, advantageously used for said device.

BACKGROUND ART

Braking and driving forces (or an inertial force) and/or other external forces, acting on a vehicle body at the acceleration and deceleration of a vehicle to cause pitching-bouncing vibration, etc. during the running of the vehicle, are reflected in a torque acting between a wheel (particularly a driving wheel during driving) and a road surface (referred to as "wheel torque" in this specification.). Then, in the field of the vibration damping control of a vehicle, it is proposed to suppress the vibration of a vehicle body during the running of a vehicle by adjusting a wheel torque through a control of a drive output of an engine or other driving device of the vehicle (For example, see Japanese Patent Laid-Open Publications 2004-168148 and 2006-69472). In such a vibration damping control through a drive output control, pitching-bouncing vibration, which arises in a vehicle body when an acceleration or deceleration demand of a vehicle is made or when an external force (a disturbance) has acted on a vehicle body to vary a wheel torque, is predicted by using a motion model constructed based upon an assumption of a dynamic model for the so-called sprung mass vibration or sprung mass and unsprung mass vibration of a vehicle body, and then, the drive output of a driving device of the vehicle is adjusted so as to suppress the predicted vibration. In the case of such a type of vibration damping control, the generation of vibrational energy is suppressed by the adjustment of the source of the vibration-generating force, rather than by absorbing the generated vibrational energy like in the vibration damping control by suspensions, and therefore, the relatively prompt vibration damping effect and good energy efficiency are advantageously obtained. Further, in the vibration damping control through a drive output control, the object to be controlled is focused into the drive output (driving torque) of a driving device, and thus, the adjustment in the control is relatively easy.

In such a vibration damping control device (or a driving force control device) performing vibration damping control through a drive output control as described above, the wheel torque actually generated in a driving wheel is to be used as an input parameter of a feedback for the suppression of a disturbance in the control. Generally, however, a sensor which can directly detect a wheel torque value during the running of a vehicle, e.g., a wheel torque sensor, a wheel's six force component meter, etc., is not installed on normal vehicles, except a vehicle for testing (see JP 2005-69897), due to problems in the designs or costs of vehicles. Thus, in a vibration damping control device as described above, an estimated wheel torque value, estimated based on a wheel speed, a rotational speed of an output shaft of a driving device of a vehicle and/or other easily detectable parameters, is employed for the wheel torque value to be fed back as a disturbance input. Such a wheel torque estimated value, obtained based on a wheel speed, etc., is monitored in various controls such as TRC (Traction Control), ABS, VSC (Vehicle Stability Control), VDIM (Vehicle Dynamics Integrated Management System) for the purposes of monitoring a road surface reaction force on a wheel or testing a running performance of a vehicle (For example, see JP H11-37872).

DISCLOSURE OF INVENTION

In the vibration damping control device as described above, or also in various kinds of other controls of a vehicle for its running, motion, or braking-driving force, when a wheel torque is not detected directly but obtained through an estimation using parameters, such as a wheel speed, the accuracy of the estimation may become worse depending on an operational condition of a wheel or a tire, and thereby, a control of a vehicle may not work well. For instance, when a wheel torque is estimated based on a detected value of a wheel speed, the accuracy of the estimation may get worse if a wheel (a driving wheel during the driving of a vehicle) falls into a slip state. Moreover, although most of wheel speed sensors currently used for usual vehicles detect a rotational speed of a wheel, the direction of its rotation (that is, whether the wheel is rolling forward or backward relative to the direction of movement of the vehicle) cannot be judged, and thus, in a control processing, it is possible to erroneously use a wheel torque to be estimated with respect to its direction. Especially, in the case of the control executing the damping of pitching and/or bouncing vibration through controlling a drive output as described above, when the magnitude and/or direction of an estimated value of a wheel torque differ from those of a wheel torque which has actually generated on a wheel, no good vibration damping effect is obtained, and on the contrary, it is possible that the vibration is amplified. However, in the conventional vibration damping control device of a vehicle and/or other controlling devices of the running, motion or braking-driving force of a vehicle employing the estimated value of a wheel torque as a parameter, a condition where a good estimation of a wheel torque is not performed is rarely considered.

Thus, one of the main objects of the present invention is to provide a device for estimating a wheel torque which is seen in a vibration damping control device as described above, wherein, in a case that no good estimation of a wheel torque is executable, while considering this, the device generates an estimated value of a wheel torque.

Further, another object of the present invention is to provide a device which controls a driving torque of a vehicle to perform a vibration damping control during the running of a vehicle based on a wheel torque estimated value obtained by a wheel torque estimating device as described above, wherein, in a case that no good estimation of a wheel torque is executable, while considering this, the device uses an estimated value of a wheel torque.

According to the present invention, briefly, there are provided a wheel torque estimating device constructed so as to appropriately correct a wheel torque estimated value when the magnitude or direction of an estimated value of a wheel torque deviates from those of the torque value actually acting on a wheel due to various reasons in a vibration damping control and/or other running, motion or braking-driving force controls of a vehicle, using an estimated value of a wheel torque without use of a torque sensor, etc. for measuring a wheel torque, and a vibration damping control device of a vehicle using such a corrected, estimated value of a wheel torque.

In accordance with one of aspects of the inventive wheel torque estimating device, a device which estimates a wheel torque which acts between a wheel of a vehicle and a road surface is characterized by comprising a torque estimating portion which estimates an estimated value of a wheel torque generated at a ground contact site of a wheel on a road surface; a slip state quantity computing portion which computes a wheel slip state quantity which indicates a slip condition of the wheel; and a wheel torque correcting portion which corrects the wheel torque estimated value such that the absolute value of the wheel torque estimated value becomes smaller when a degree of a slip indicated by the wheel slip state quantity is larger. In this regard, in this specification, "The slip state or condition of a wheel" means a condition that a force which a wheel exerts on a road surface exceeds beyond a grip limit (the maximum friction circle) of the wheel (or a tire) during the running of a vehicle, whereby the wheel "slips" on the road surface, and "the degree of a slip" corresponds to the magnitude of a frictional force between a wheel surface and a road surface in a slip state (When a relative slip occurs between a wheel surface and a road surface, the slip between the wheel surface and road surface becomes larger as the frictional force decreases.). A wheel torque estimated value is, although dependent upon ways of estimation, usually computed on the assumption that a wheel grips a road surface. However, if a wheel falls into a slip state, said assumption becomes invalid and the accuracy of a wheel torque estimated value would get worse. Thus, in the inventive wheel torque estimating device, the "wheel slip state quantity" which indicates the slip condition of a wheel is computed, and, as the degree of a slip indicated by the wheel slip state quantity becomes larger, a wheel torque estimated value is corrected such that its absolute value becomes smaller. The wheel torque estimated value is estimated on the assumption that the wheel grips the road surface, but, if the wheel slips, the force or torque transmitted from the road surface to the wheel will be reduced. Thus, when a wheel is in such a slip state, the wheel torque estimated value is corrected smaller, and thereby, the wheel torque estimated value is expected to become closer to an actual value.

It should be understood that, for the "wheel slip state quantity" indicating a slip condition of a wheel, an arbitrary amount may be employed if the amount can be used as an index value enabling the detection of the transition from a grip state to a slip state on a wheel. For instance, a slip ratio of a wheel or a ratio of slippages may be used as a wheel slip state quantity (Although the word of a "slip" is used in these terms, in this case, irrespective of whether a tire grips a road surface or not, "slip" means a gap between a vehicle speed and a wheel speed (a value obtained by multiplying a rotational speed of a wheel and a wheel radius), and therefore the meaning of "slip" is different from that in the case that a wheel slips on a road surface as in the above-mentioned "slip state".), but preferably, for instance, during the driving of a vehicle, the ratio of a wheel speed of a driving wheel and a wheel speed of a driven wheel (idler wheel) of a vehicle may be used as a wheel slip state quantity (In the acceleration of a vehicle, irrespective of whether or not a driving wheel is in a grip state, the wheel speed of a driven wheel is a value corresponding to a vehicle speed, but, the wheel speed of a driving wheel, when falling into a slip state, no longer corresponds to a vehicle speed.).

In the above-mentioned wheel torque estimating device, although the estimation of a wheel torque estimated value may be performed through arbitrary processes, typically, as explained in an embodiment of the present invention described later, the estimation may be performed based upon a wheel speed (or a wheel rotational speed) detected with a wheel speed sensor of a wheel of a vehicle. In this case, during the driving of a vehicle, a wheel torque estimated value may be computed as a function of a differential value of a wheel speed of a driving wheel.

In another aspect of a wheel torque estimating device, the inventive device comprises a torque estimating portion which estimates a wheel torque estimated value based on a wheel speed detected by a wheel speed sensor of a wheel; and a wheel torque correcting portion which corrects a wheel torque estimated value to a negative value during the reverse traveling of a vehicle. As briefly noted above, in the estimation of a wheel torque estimated value based on a wheel speed given by a wheel speed sensor, most of wheel speed sensors installed on usual, mass-produced vehicles, except some high-class sensors, can not detect the rotational direction of a wheel. Thus, in a control which uses a wheel torque as one of its inputs, if the wheel torque estimated value estimated from a wheel speed sensor is directly used, it could happen that the contribution of the wheel torque would be reflected in the opposite direction when the wheel rotates (is rolling) backward during the reverse traveling of a vehicle, etc. Then, for one of the aspects of the correction of a wheel torque estimated value in the present invention, when a wheel rotates backward as described above (The reverse traveling of a vehicle or the backward rotation of a wheel may be judged with the position of a shift lever or a switch for a change gear of the vehicle.), a wheel torque estimated value is corrected to be a negative value (while keeping its magnitude as it is). In this regard, it should be understood that, preferably, the correction of making a wheel torque estimated value into a negative value may be performed together with the correction based on a wheel slip state quantity.

In the present invention, a wheel torque estimated value for which the correction based on a wheel slip state quantity and/or the correction in the reverse traveling of a vehicle as described above are carried out is advantageously used especially in a vibration damping control device of a vehicle which suppresses pitching or bouncing vibration of the vehicle through controlling a driving torque of the vehicle. Thus, in one aspect of the inventive vibration damping control device, a vehicle vibration damping control device comprises a wheel torque estimated value acquisition portion which acquires an estimated value of a wheel torque generated on a ground contact site of a wheel of a vehicle to a road surface and acting on the wheel; and a driving torque control portion which controls a driving torque of the vehicle to suppress pitching or bouncing vibrational amplitudes based on the wheel torque estimated value, wherein a slip state quantity acquisition portion which acquires a wheel slip state quantity indicating a slip condition of a wheel is provided; an absolute value of the wheel torque estimated value or a controlled variable of a driving torque is corrected smaller as a degree of a slip expressed by the wheel slip state quantity is larger; and a driving torque of the vehicle is controlled with reference to the corrected wheel torque estimated value. Further, for an alternative aspect, in such a vehicle vibration damping control device having a wheel torque estimated value acquisition portion and a driving torque control portion as described above, in a case that a wheel torque is estimated based on a wheel speed detected with a wheel speed sensor of a wheel, the wheel torque estimated value acquired by the wheel torque estimated value acquisition portion may be corrected into a negative value during the reverse traveling of the vehicle and, with reference to the corrected wheel torque estimated value, the driving torque of the vehicle may be controlled. In this regard, the above-mentioned vibration damping control device may use a wheel torque estimated value generated by a device other than the vibration damping control device, and also, a torque estimating device or a means of generating wheel torque estimated value may be established in the interior of the vibration damping control device and the estimated value generated there may be corrected.

As explained in more detail in the below-mentioned embodiment of the present invention, for instance, the above-mentioned vehicle vibration damping control device which suppresses pitching or bouncing vibration of a vehicle through controlling a driving torque of the vehicle may be a device which adjusts a wheel torque, i.e., a driving torque of the vehicle so as to reduce an amplitude of sprung mass vibration and/or unsprung mass vibration of a vehicle body based upon a dynamical motion model, which is assumed for sprung mass vibration or unsprung mass vibration of a vehicle body during the running of the vehicle while a wheel torque is regarded as an external force inducing pitching or bouncing vibration in the vehicle body. A wheel torque estimated value is inputted as the feedback or disturbance in this vibration damping control, wherein the wheel torque estimated value will be corrected in the same way as in the above-mentioned wheel torque estimating device when a wheel is in a slip state or rotates backward. As can be understood from the explanation of the above-mentioned wheel torque estimating device, through the correction of the wheel torque estimated value during a wheel being in a slip state or rotating backward, expectedly, the wheel torque estimated value used for the vibration damping control device will become closer to an actual wheel torque value with respect to its magnitude and/or direction, and therefore, even when no good estimation of a wheel torque cannot be done, a good vibration damping control is expected to be achieved. In this connection, it should be understood that the technical concept for the correction of a wheel torque estimated value in the present invention can be applied for vibration damping control devices using a wheel torque estimated value other than the above-described vibration damping control device, and such cases are within the scope of the present invention.

In the vibration damping control device through a driving torque control of a vehicle in the above-mentioned aspect of the present invention, in a case that a wheel torque estimated value is a value estimated based on a wheel speed detected with a wheel speed sensor of a driving wheel of a vehicle, if the wheel speed sensor does not function properly, a wheel torque estimated value may be corrected to be a value estimated based on a rotational speed of an output shaft of a driving device of the vehicle. Theoretically, a wheel speed and a rotational speed of an output shaft of a driving device of a vehicle correlate with each other (If the wheel speed changes due to a certain factor, the "rotational speed" of the output shaft of the driving device should change.), and thus, when an abnormality arises in a wheel speed sensor and a wheel speed cannot be detected with a sufficient accuracy, a wheel torque estimated value is acquired based on a rotational speed of an output shaft of a driving device through the relation between the wheel speed and the rotational speed of the output shaft of the driving device of the vehicle, and thereby, the vibration damping control can be executed also when an abnormality occurs in a wheel speed sensor.

Further, in the above-mentioned vibration damping control device, when it is judged that no good vibration damping control is performable even with the execution of the correction of a wheel torque estimated value, the control of a driving torque based on the wheel torque estimated value may be stopped. Moreover, the effects of the vibration damping control are for an operational stability of a vehicle and the improvement in a riding comfortableness, and therefore, if it is judged that it is not necessary to perform the vibration damping control when a wheel is in a slip state, during the reverse traveling of a vehicle and/or when an abnormality occurs in a wheel speed sensor, the control of a driving torque based on a wheel torque estimated value may be stopped. Especially, the device may be adapted to stop the control of a driving torque based on a wheel torque estimated value when a wheel is in a slip state and the degree of a slip indicated by a wheel slip state quantity is larger than a predetermined degree. According to such a structure, the occurrence of the amplification of vibration due to an input of an inappropriate torque value into the vibration damping control will be inhibited.

By the way, in vehicles, such as automobile in recent years, there are installed control devices which control a braking system of a vehicle, for example, control devices of VSC, TRC, VDIM, ABS, etc. (hereafter, referred to as a "braking control device".). These braking control devices compute a "wheel slip state quantity" which indicates a slip condition of a wheel as described above, and, based on the computed value, execute controls according to the respective control processes, such as control for decreasing a slip ratio of a wheel. Thus, the inventive vibration damping control device may be adapted to use the "wheel slip state quantity" computed by a braking control device as described above, thereby providing the simplification or the improvement of the efficiency in the structure of the control in one vehicle (avoiding the overlapping of the measurement or computation of the same measured value, controlled variable, etc.). However, in that case, under a condition where a braking control device is not operating due to any certain reason, the information about the degree of a slip of a wheel could not be inputted into a vibration damping control device so that the vibration damping control based upon a wheel torque estimated value can not be executed appropriately. As already described, when a wheel is in a slip state, a wheel torque estimated value estimated based on a wheel speed becomes more excessive than a torque actually generated on the wheel.

Thus, if the driving torque control is executed based on such a wheel torque estimated value under the condition where a slip state cannot be judged while the wheel is in a slip state, not only the vibration damping effect may decreases but also longitudinal vibration of the vehicle may arise due to the excessive variation of a driving torque. Such a condition is contrary to the purpose, expected in the vibration damping control, of improving the operational stability and the degree of a riding comfortableness of a vehicle.

Thus, in another aspect of the present invention, a vibration damping control device of a type of executing a vibration damping control in which pitching or bouncing vibration of a vehicle body is suppressed through a drive output control of a vehicle comprises a wheel torque estimated value acquisition portion which acquires an estimated value of a wheel torque generated on a ground contact site of a wheel of the vehicle onto a road surface and acting on the wheel; a driving torque control portion which controls a driving torque of the vehicle to suppress pitching or bouncing vibrational amplitudes based on the wheel torque estimated value; and further, a slip state quantity acquisition portion which acquires a wheel slip state quantity which indicates a slip condition of a wheel from a braking control device of the vehicle for reducing a slip of the wheel, wherein a controlled variable of the driving torque may be corrected based on the degree of the slip indicated by the wheel slip state quantity and, the controlled variable of the driving torque may be reduced when the braking control device cannot operate as compared with when the braking control device can operate.

According to the above-mentioned structure, in a vibration damping control device which acquires a wheel slip state quantity indicating a slip condition of a wheel from a braking control device of a vehicle, when the braking control device cannot operate or when its operation is forbidden, namely, when the slip condition cannot be monitored, the controlled variable of the driving torque is decreased as compared with when the braking control device can operate, and thereby the occurrence of the unfavorableness due to the operation of the vibration damping control device when a wheel falls in a slip state will be avoided.

Moreover, in the further above-mentioned aspect, especially, in a case that a controlled variable of a driving torque provided by the driving torque control portion is determined based on the wheel torque estimated value and a requested driving amount from a driver of the vehicle (for example, based on the depression of an accelerator pedal), if the braking control device cannot operate, the controlled variable of the driving torque based on the wheel torque estimated value may be reduced to substantially 0. Thereby, in a case that a condition of a wheel cannot be detected and a wheel torque estimated value cannot be computed with a sufficient accuracy, the vibration damping control against disturbance is substantially stopped and any occurrence of unfavorableness due to an operation of the vibration damping control device will be suppressed. On the other hand, as for the vibration damping control based on the requested driving amount from the driver of the vehicle (corresponding to the "feedforward control" in the following embodiment.), since its controlled variable is not dependent on the accuracy of a wheel torque estimated value, the control may be executed. When a tire of a wheel is in a slip state, however, no good driving torque control to the wheel is executed so that the reduction of the controlled variable or the stop of the control execution may be done.

In the above-mentioned structure, a braking control device may be at least one chosen from the group including ABS control, VSC and TRC, selectively made into an operable condition by a driver of a vehicle. When, in accordance with a driver's selection, the braking control device is not made operable, a controlled variable of a driving torque may be reduced as compared with when the braking control device is operable. Moreover, in a case that a vehicle is equipped with so-called, VDIM, i.e., a device, including ABS control, VSC and TRC, steering control, which integrally controls the behavior stability of the vehicle, the braking control device may be a part of the VDIM, and, a controlled variable of a driving torque may be reduced when the VDIM is not operable in accordance with the driver's option. In those cases, in the reducing of the controlled variable of the driving torque, the vibration damping control based on a wheel torque estimated value may be substantially stopped.

Furthermore, also in the above-described aspect, when a braking control device is not operable due to the occurrence of an abnormality in a braking device, the condition of a wheel becomes undetectable so that a controlled variable of a driving torque may be reduced as compared with where the braking control device is operable. In this case, also, in the reducing of the controlled variable of the driving torque, the vibration damping control based on a wheel torque estimated value may be substantially stopped.

Generally, in accordance with the present invention, even when no good estimation of a wheel torque can be performed, an estimated value near an actual wheel torque value can be acquired so that it is expected that a vibration damping control of a vehicle will be performed better than ever. Further, it should be understood as an advantage of the present invention that, in the past, for the acquisition of a wheel torque value even when a wheel is in a slip state or rotates backward, it would be required to provide any device, such as a torque sensor, on a wheel, but in accordance with the present invention, without such a sensor, the value of a wheel torque to be used in the control of the running, the motion, the braking-driving force or vibration damping for a vehicle becomes available. Since there is no need to prepare a torque sensor device especially for the acquisition of a wheel torque value, the cost for a vehicle or a control device and/or the labor required for the designing thereof will be reduced.

Moreover, as for one of the above-mentioned aspects of the present invention, in a case that the inventive vibration damping control device is adapted to use the wheel slip state quantity computed by the braking control device, when the braking control device is not operable, a controlled variable of a driving torque is reduced as compared with when the braking control device is operable. According to this structure, the occurrence of unfavorableness resulting from the operation of vibration damping control device under conditions where the braking control device is not operable will be avoided. In particular, on vehicles in recent years, an integrative running control, such as VDIM, becomes available for the execution of multiple controls, and therefore the structural simplification and efficiency improvement are required for the reduction of the cost and manufacturing labor for a vehicle and the burden during the use of a vehicle. It can be said that, in a case that such plural control structures are installed in one vehicle, the inventive structure prevents the occurrences of unexpected, inappropriate operations of a vibration damping control device The other objects and advantages of the present invention will become apparent in the explanation of the following preferable embodiments of the present invention.

BRIEF EXPLANATION OF THE DRAWINGS

FIG. 1 (A) shows a schematic diagram of an automobile in which a preferable embodiment of a vibration damping control device in accordance with the present invention is realized. FIG. 1 (B) is a more detailed schematic diagram of the internal structure of the electronic control device of FIG. 1 (A).

FIG. 2 (A) is a drawing explaining state variables of vehicle body vibration to be suppressed in the vibration damping control device of one preferable embodiment of the present invention. FIG. 2 (B) is a drawing showing a structure in a vibration damping control in a preferable embodiment of the present invention in a form of a control block diagram.

FIG. 3 (A) shows a sprung mass vibration model, and FIG. 3 (B) shows a sprung mass and unsprung mass vibration model.

BEST MODE OF THE PRESENT INVENTION

The present invention is explained in detail with respect several preferable embodiments, referring to the drawings accompanying in the following. In the drawing, the same reference numeral indicates the same portion.

A Structure of a Device

Figure 1:
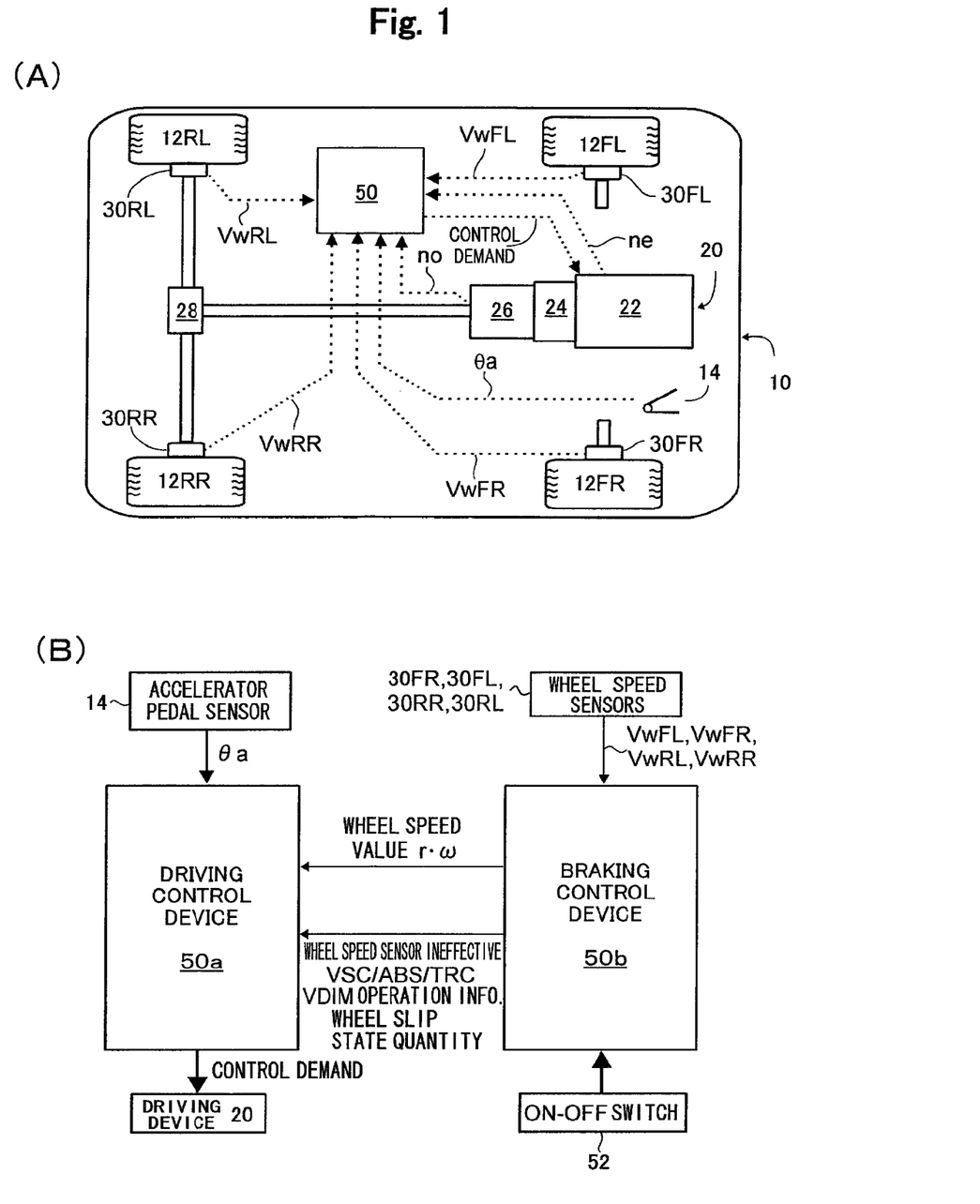

FIG. 1 (A) schematically shows a vehicle, such as an automobile, in which a preferable embodiment of the inventive vibration damping control device is installed. In this drawing, in the vehicle 10 having left and right front wheels 12FL and 12FR and left and right rear wheels 12RL and 12RR, there is installed a driving device 20 which generates a driving force or a driving torque in the rear wheels according to the depression of an accelerator pedal 14 by a driver in a usual manner. In the shown example, the driving device 20 is constructed such that a driving torque or a rotational driving force is transmitted from an engine 22 through a torque converter 24, an automatic transmission 26, a differential gear 28, etc. to the rear wheels 12RL and 12RR. However, instead of the engine 22, the driving device may be an electric type using an electric motor or a hybrid type having both an engine and an electric motor. Further, the vehicle may be a four-wheel drive vehicle or a front wheel drive vehicle. In this connection, although not illustrated for the simplicity, the vehicle is provided with a braking device generating a braking force on each wheel and a steering device for controlling a steering angle of the front wheels or front and rear wheels as in a normal vehicle.

The operation of the driving device 20 is controlled by an electronic control device 50. The electronic control device 50 may include a normal type of a microcomputer and drive circuits having a CPU, a ROM, a RAM, and input/output port devices mutually connected with bidirectional common bus. Into the electronic control device 50, inputted are signals indicating wheel speeds Vwi (i=FL, FR, RL, RR) from wheel speed sensors 30i (i=FL, FR, RL, RR) installed in the respective wheels; signals from sensors provided on various parts in the vehicle, such as an engine's rotational speed ne, a transmission's rotational speed no, a depression amount of the accelerator pedal θa, etc. In this regard, it should be understood that, in addition to the above, various detected signals may be inputted for obtaining various parameters required for various controls to be executed in the vehicle of this embodiment. The electronic control device 50 may be constructed to comprise a driving control device 50a which controls the operation of the driving device 20, and a braking control device 50b which controls the operation of the braking device (not shown) as schematically shown more in detail in FIG. 1 (B).

Braking control devices 50b may be a device executing a braking control well-known for a person skilled in the art, such as ABS control, VSC and TRC, namely, which inhibits the frictional force between a wheel and a road surface (a vectorial sum of the longitudinal force and lateral force on the wheel) from becoming excessive beyond a limit, and/or controls a longitudinal force or a slip ratio on a wheel in order to avoid a behavioral deterioration of the vehicle resulting from the wheel's frictional force exceeding its limit. Or the braking control device may be a part of a VDIM including steering control etc. as well as the wheel slip ratio controls of ABS control, VSC and TRC, for stabilizing a vehicle behavior. Into such a braking control device, as shown in the drawing, electrical signals of a pulse form generated sequentially at every rotation of a predetermined amount in the respective wheels are inputted from the wheel speed sensors of the respective wheels 30FR, FL, RR and RL; the rotational speed of each wheel is computed by measuring the time interval between the arrivals of the sequentially inputted pulse signals; and a wheel speed value r·ω is computed out by multiplying the wheel's rotational speed and the corresponding wheel radius. Moreover, as described later in detail, for calculation of a wheel torque estimated value, in the braking control device 50b, there may be executed a judgment of whether or not a tire of a wheel is in a slip state and a computation of a "wheel slip state quantity", an index value indicating the degree of a slip when the wheel is in a slip state. The wheel speed value r·ω and wheel slip state quantity are transmitted to the driving control device 50a, for computing a wheel torque estimated value. In this regard, the calculation from a wheel rotational speed to a wheel speed may be performed in the driving control device 50a. In this case, the wheel rotational speed is given from the braking control device 50b to the driving control device 50a.

The braking control, such as ABS control, and VSC, TRC, or control by VDIM as described above are selectively made operable by an ON-OFF switch 52 (which may be prepared for every executable control although only one is prepared for the simplicity in the drawing,) provided in a position accessible by a driver of the vehicle (e.g., an arbitrary position on the front panel of a driver's seat). Accordingly, in accordance with the driver's intention, these braking controls are rendered operable only when the switch 52 is ON, and inoperable when a switch 52 is OFF. Further, though not shown, in a case that the operation of the braking device is abnormal or in a case that a wheel speed sensor is abnormal, it is detected in a manner known in one skilled in the art that the braking control becomes impossible, and in that case, the operation of the above-mentioned braking control device is rendered forbidden. Then, when the operation of the braking control device has become prohibited, the computation of a wheel slip state quantity is also no longer executed. Thus, in that case, as described below, the vibration damping control based on a wheel torque estimated value by the vibration damping control device may be stopped. For this purpose, from the braking control device 50b to the driving control device 50a, signals indicating whether or not various controls, such as VSC, ABS, or TRC, for controlling a slip ratio of a wheel are each operable may be transmitted as well as a wheel speed value and a wheel slip state quantity.

Moreover, as explained in the following, the inventive device may be adapted such that the execution of the correction of a wheel torque estimated value based upon the degree of a slip condition of a wheel is allowed only when the control of VSC, ABS, or TRC is actually executed. In that case, from the braking control device 50b to the driving control device 50a, the information indicating the presence or absence of execution of the respective controls, such as VSC, ABS, or TRC, for controlling a slip ratio of a wheel, is transmitted as well as the above-mentioned series of signals. Furthermore, if any abnormality is in the wheel speed sensors so that no wheel speed value can be acquired, it is necessary to change the estimating way of a wheel torque estimated value, and therefore, wheel speed ineffective status information which indicates that a wheel speed value is unacquirable may be given from the braking control device 50b to the driving control device 50a.

In the driving control device 50a, a target output torque (requested driving torque) for the driving device requested by a driver is determined based on the depression amount of the accelerator pedal θa. However, in the inventive driving control device, the requested driving torque is corrected in order to execute the control for suppressing (damping) pitching/bouncing vibration of the vehicle body through a driving torque control, and a control demand corresponding to the so corrected requested torque is given to the driving device 20. In this pitching/bouncing vibration damping control, there are executed (1) computation of an estimated value of a wheel torque of the driving wheel(s) caused by a force acting against a road surface on the driving wheel; (2) calculation of state quantities of pitching/bouncing vibration through a motion model of vehicle body vibration; and (3) computation of the amount of correction for the wheel torque for suppressing the pitching/bouncing vibrational state quantities and correction of the requested torque based thereon. The wheel torque estimated value in (1) may be computed based on a wheel speed value of the driving wheel (or a wheel rotational speed of the driving wheel) received from the braking control device 50*b*, or the engine rotational speed ne. In this regard, it should be understood that the inventive vibration damping control device is realized in the processing operations of (1)-(3), and the inventive wheel torque estimating device is realized in the processing operation of (1).

A Structure of a Driving Torque Control Performing a Control for Damping Pitching/Bouncing Vibration of a Vehicle Body In a vehicle, when a driving device operates based on a driver's drive demand and a variation of a wheel torque arises, in a vehicle body 10 as illustrated in FIG. 2(A), there may arise the bouncing vibration in the perpendicular direction (the z direction) of the centroid Cg of the vehicle body and the pitching vibration in the pitch direction (the θ direction) around the centroid of the vehicle body. Moreover, when an external force or torque (a disturbance) acts on a wheel from a road surface during the running of the vehicle, the disturbance may be transmitted to the vehicle and the vibrations of the bounce direction and the pitch direction may also arise in the vehicle body. Then, in the illustrated embodiment, there is constructed a motion model of the pitching and bouncing vibration of a vehicle body, where displacements z and θ and their rate of change dz/dt and dθ/dt in the vehicle body, i.e., the state variables of the vehicle body vibration at a time when a value of a wheel torque converted from a requested driving torque and the estimated value of the present wheel torque are inputted in the model, are computed; and then, the driving torque of the driving device is adjusted (the requested driving torque is corrected) so that the state variables obtained from the model will be converged into 0, namely, the pitching/bouncing vibration will be suppressed.

FIG. 2(B) schematically shows a structure of a driving torque control in an embodiment of the present invention in the form of a control block diagram (In this regard, the operation of each control block (except C0 and C3) is performed by either of the driving control device 50*a* and braking control device 50*b* in the electronic control device 50.). With reference to FIG. 2(B), generally, in the driving torque control of the embodiment of the present invention, there are prepared a drive controller which gives a driver's drive demand to the vehicle, and a vibration damping controller for correcting the driver's drive demand so that the pitching/bouncing vibration of the vehicle body may be suppressed. In the drive controller, after the driver's drive demand, i.e., the depression amount of the accelerator pedal (C0) is converted into a requested driving torque in a usual manner (C1), the requested driving torque is converted into a control demand for the driving device (C2), which is then transmitted to the driving device (C3). [The control demand will be a target throttle valve opening for a gasoline engine; a target fuel injection amount for a diesel engine; and a target electric current amount for an electric motor, etc.]

On the other hand, the vibration damping controller consists of a feedforward control portion and a feedback control portion. The feedforward control portion has a structure of, what is called, an optimal regulator, where, as explained below, a value of a wheel torque which is converted from the requested driving torque in C1 (a wheel torque requested from the driver Tw0) is inputted into a motion model portion (C4) of the pitching and bouncing vibration of the vehicle body; in which motion model portion (C4), the responses to the inputted torque in the state variables of the vehicle body are computed; and a correction amount of the requested driving wheel torque for converging the state variables to their minimums is computed (C5). Further, in the feedback control portion, a wheel torque estimated value Tw is computed in a wheel torque estimator (C6) as explained later, and the wheel torque estimated value, after multiplied by a feedback control gain FB (a gain for adjusting the balance of contributions between the requested wheel torque from the driver Tw0 and the wheel torque estimated value Tw in the motion model—C7), is inputted into the motion model portion (C4) as a disturbance input, while being added to the requested wheel torque, and thereby, the correction component for the requested wheel torque against a disturbance is also computed. The correction amount for the requested wheel torque in C5 is converted in the unit of the requested torque for the driving device and transmitted to a summer (C1*a*), and thus, the requested driving torque, after being so corrected that no pitching and bouncing vibration will arise, is changed into a control demand (C2), and given to a driving device (C3).

The Principle of Vibration Damping Control

As already noted, in the vibration damping control in the embodiment of the present invention, first, a dynamic motion model of a vehicle body in its bounce and pitch directions is assumed, where a state equation of the state variables in the bounce direction and the pitch direction is constructed such that a requested wheel torque from a driver Tw0 and a wheel torque estimated value Tw (disturbance) are rendered as inputs. Then, from this state equation, an input (torque value) which will make the state variables in the bounce direction and pitch direction converged into 0 is determined by using the theory of the optimal regulator, and, based on the resultant torque value, the requested driving torque is corrected.

Figure 3:
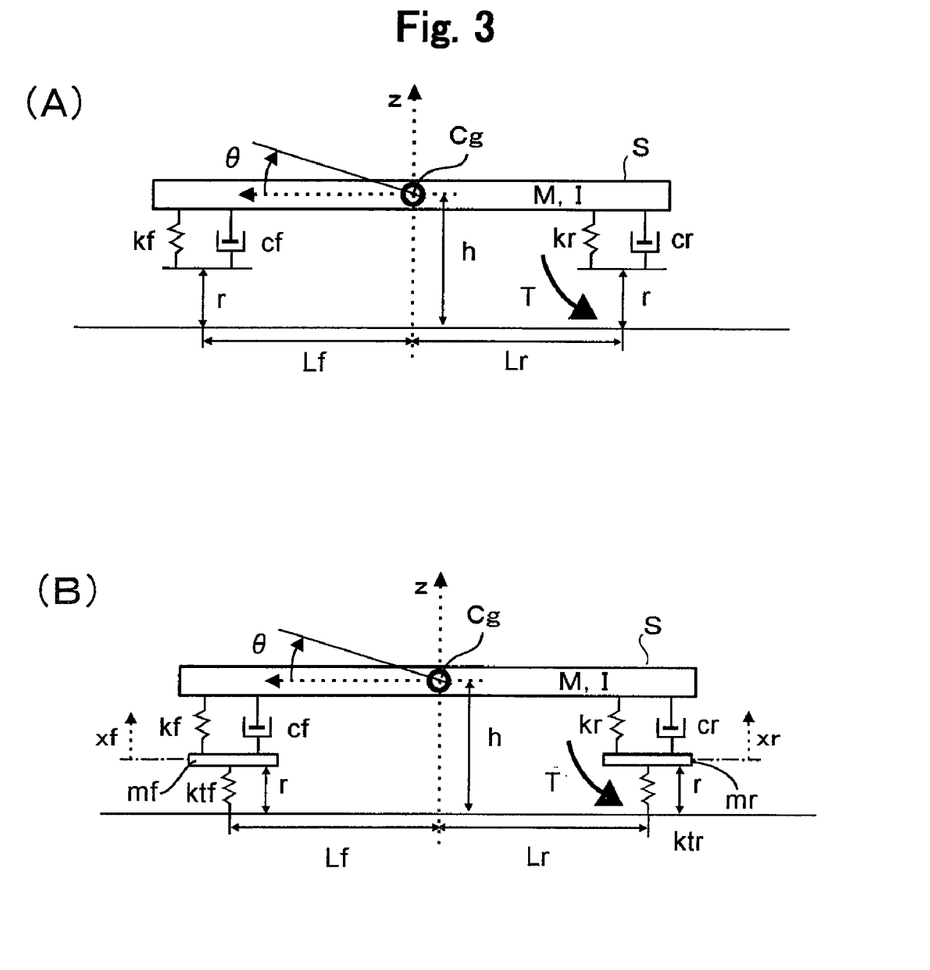
FIG. 3 is drawings explaining about dynamic motion models of vehicle body vibration assumed in a vibration damping control device of a preferable embodiment invention.

For the dynamic motion model of the bounce direction and pitch direction of a vehicle body, for example, as shown in FIG. 3(A), the vehicle body is regarded as a rigid body S having a mass M and a moment of inertia I, and suppose that this rigid body S is supported by front wheel suspensions of an elastic modulus kf and a damping factor cf and rear wheel suspensions of an elastic modulus kr and a damping factor cr (sprung mass vibration model of a vehicle body). In this case, the equations of motion in the bounce direction and in the pitch direction of the centroid of the vehicle body can be expressed as shown in the followings (1a) and (1b).

$$M \frac{d^2 z}{dt^2} = -kf(z + Lf \cdot \theta) - \tag{1a}$$
$$cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right)$$

$$I \frac{d^2 \theta}{dt^2} = -Lf\left\{kf(z + Lf \cdot \theta) - cf\left(\frac{dz}{dt} + Lf \cdot \frac{d\theta}{dt}\right)\right\} + \tag{1b}$$
$$Lr\left\{kr(z - Lr \cdot \theta) + cr\left(\frac{dz}{dt} - Lr \cdot \frac{d\theta}{dt}\right)\right\} + \frac{h}{r} \cdot T$$

where Lf and Lr are the distances from the centroid to the front wheel axis and the rear wheel axis, respectively; r is a wheel radius; and h is the height of the centroid from a road surface. In this respect, in the expression (1a), the 1st and 2nd terms are the force components from the front wheel axis, and the 3rd and 4th terms are those from the rear wheel axis, and in the expression (1b), the 1st term is a component of a moment of force from the front wheel axis, and the 2nd term is that from the rear wheel axis. The 3rd term in the expression (1b) is the component of a moment of force exerted around the centroid of the vehicle body by a wheel torque T (=Tw0+Tw) generated in the driving wheel.

The above-mentioned equation (1a) and (1b) can be rewritten in the form of a state equation (of a linear system) while displacements z and θ and their rate-of-change dz/dt and dθ/dt in the vehicle body are regarded as components of a state variable vector X (t), as in the following equation (2a)

$$dX(t)/dt = A \cdot X(t) + B \cdot u(t) \quad (2a),$$

where X (t), A and B are each, $$X(t) = \begin{pmatrix} z \\ \frac{dz}{dt} \\ \theta \\ \frac{d\theta}{dt} \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix}$$

The respective components a1-a4 and b1-b4 in the matrix A are given by gathering up the coefficients z, θ, dz/dt, and dθ/dt in the expressions (1a), (1b):

$$a1 = -(kf+kr)/M; \; a2 = -(cf+cr)/M;$$

$$a3 = -(kf \cdot Lf - kr \cdot Lr)/M; \; a4 = -(cf \cdot Lf - cr \cdot Lr)/M,$$

$$b1 = -(Lf \cdot kf - Lr \cdot kr)/I; \; b2 = -(Lf \cdot cf - Lr \cdot cr)/I;$$

$$b3 = -(Lf^2 \cdot kf + Lr^2 \cdot kr)/I; \; b4 = -(Lf^2 \cdot cf + Lr^2 \cdot cr)/I.$$

Moreover, u (t) is:

$$u(t) = T,$$

which is the input of the system expressed with the state equation (2a). Accordingly, from the expression (1b), the component p1 of the matrix B is:

$$p1 = h/(I \cdot r).$$

In the state equation (2a), if $$u(t) = -K \cdot X(t) \quad (2b),$$

is put, the state Equation (2a) will become $$dX(t)/dt = (A - BK) \cdot X(t) \quad (2c).$$

Thus, when the differential equation (2c) of the state variable vector X (t) is solved while an initial value X0 (t) of X (t) is set to X0(t)=(0,0,0,0) (it is assumed that no vibration exists before an input of a torque), the torque value u(t) which suppresses the pitching and bouncing vibration will be determined by determining the gain K which makes the magnitude of X (t), i.e. displacements and their rates of change in time in the bounce and pitch directions, converging to 0.

Gain K can be determined using what is called the theory of Optimal Regulator. According to this theory, it is known that, when the value of the evaluation function of a secondary form:

$$J = \tfrac{1}{2} \int (X^T Q X + u^T R u) dt \quad (3a)$$

(where the range of the integration is from 0 to ∞.)
becomes the minimum, X (t) in the state equation (2a) is stably converged, and the matrix K which makes the evaluation function J to its minimum can be given by:

$$K = R^{-1} \cdot B^T \cdot P,$$

where P is a solution of the Riccati equation:

$$-dP/dt = A^T P + PA + Q - PBR^{-1}B^T P.$$

The Riccati equation can be solved by an arbitrary process known in the field of linear systems, and thereby the gain K will be determined.

The Q and R in the evaluation function J and the Riccati equation are a semi-positive definite symmetrical matrix or a positive definite symmetrical matrix which can be set up arbitrarily, respectively, and those are weight matrixes in the evaluation function J to be determined by a designer of the system. For example, in the case of the motion model considered here, Q and R may be set out as, $$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1)$$

and, in the expression (3a), if a norm (magnitude) of a particular one among the components of a state vector, e.g. dz/dt, dθ/dt, is set out greater than a norm of the other components, e.g. z, θ, the component whose norm is set out greater will more stably converge. Moreover, by setting a larger value for the component of Q, the transient property in the system will be importantly considered, namely, the values of the state vector will be made converged more promptly to stable values, and by setting a larger value for R, the consumption energy in the system will be reduced.

Figure 2:
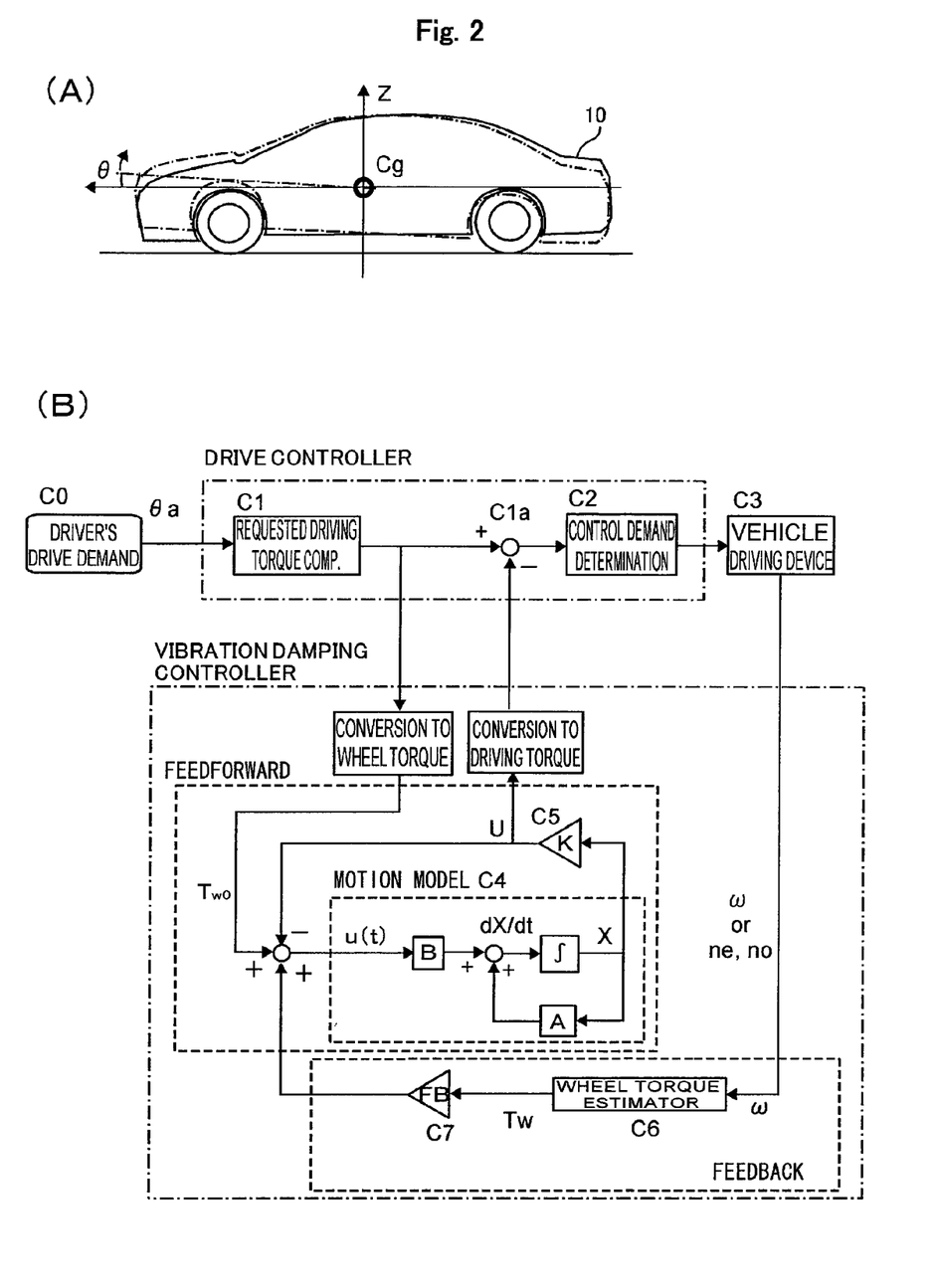

In an actual operation of the vibration damping control device, as shown in the block diagram of FIG. 2 (B), the state variable vector X (t) is computed by solving the differential equation of the equation (2a) using a torque input value in the motion model C4. Then, the value U (t) is obtained in C5 by multiplying the state vector X (t), i.e. the output from the motion model C4, and the gain K determined for converging the state variable vector X(t) into 0 or its minimum as above, and in the summer (C1a), the value U(t), after converted in the unit of a torque for the driving device, is subtracted from the requested driving torque (the value U (t) may be fed back also to the torque input value of the motion model C4 for the operation of the motion model C4 (state feedback).). The system expressed by the expression (1a) and (1b) is a resonance system, and thus, for an arbitrary input, the values of the state variable vector are made substantially of the frequency components of a band having a certain spectral characteristic in which the resonant frequency of the system is centered. Accordingly, by the structure in which U (t) (its converted value) is subtracted from the requested driving torque, the components of the resonant frequency of the system, namely, the components which causes pitching-bouncing vibration in the vehicle body, in the requested driving torque are corrected so that the pitching-bouncing vibration in the vehicle body will be suppressed. And when a variation causing pitching-bouncing vibration arises in Tw (disturbance) transmitted from a wheel torque estimator, the requested torque demand to be inputted into the driving device is corrected with −U (t) so that the vibration due to Tw (disturbance) will be converged.

The vibrational resonance frequency in the pitch and bounce directions of a vehicle, such as a normal car, is around 1-2 Hz, and, for the level of the vibrational speed in this frequency band, according to the speed of a control response in a wheel torque to a demand in a present vehicle, it is possible to detect a torque disturbance in a wheel and to make the compensation amount (correction amount) U reflected in the driving torque of a wheel against the disturbance. Thus, a disturbance torque generated on a wheel and capable of causing pitching-bouncing vibration and the pitching-bouncing vibration induced therefrom will be cancelled by a variation in the driving torque outputted from the driving device through the correction of the requested driving torque by the vibration damping control.

In this connection, as a dynamic motion model of a vehicle body in the bounce and pitch directions, for example, as shown in FIG. 3(B), a model in which spring elasticities of tire of front and rear wheels are taken into account as well as the structure in FIG. 3(A) may be employed (the sprung mass and unsprung mass vibration model of a vehicle body). When tires of front and rear wheels have elastics modului ktf and ktr, respectively, as seen from FIG. 3(B), the equation of motion in the bounce direction and the equation of motion in the pitch direction for the centroid of a vehicle body are expressed by the following expressions (4):

$$M\frac{d^2z}{dt^2} = -kf(z+Lf\cdot\theta-xf) - cf\left(\frac{dz}{dt}+Lf\cdot\frac{d\theta}{dt}-\frac{dxf}{dt}\right) - \tag{4a}$$
$$kr(z-Lr\cdot\theta-xr) - cr\left(\frac{dz}{dt}-Lr\cdot\frac{d\theta}{dt}-\frac{dxr}{dt}\right)$$

$$I\frac{d^2\theta}{dt^2} = -Lf\left\{kf(z+Lf\cdot\theta-xf) - cf\left(\frac{dz}{dt}+Lf\cdot\frac{d\theta}{dt}-\frac{dxf}{dt}\right)\right\} + \tag{4b}$$
$$Lr\left\{kr(z-Lr\cdot\theta-xr) + cr\left(\frac{dz}{dt}-Lr\cdot\frac{d\theta}{dt}-\frac{dxr}{dt}\right)\right\} + \frac{h}{r}\cdot T$$

$$mf\frac{d^2xf}{dt^2} = kf(z+Lf\cdot\theta-xf) + cf\left(\frac{dz}{dt}+Lf\cdot\frac{d\theta}{dt}-\frac{dxf}{dt}\right) + ktf\cdot xf \tag{4c}$$

$$mr\frac{d^2xr}{dt^2} = kr(z-Lr\cdot\theta-xr) + cr\left(\frac{dz}{dt}-Lr\cdot\frac{d\theta}{dt}-\frac{dxr}{dt}\right) + ktr\cdot xr \tag{4d}$$

where xf and xr each are the amounts of displacements of unsprung masses of the front and rear wheels, and mf and mr each are the unsprung masses of the front wheel and rear wheels. Like in the case of FIG. 3(A), the expressions (4a)-(4b) constitute the state equations, where z, θ, xf, xr, and their time differential values are used in a state variable vector, as in the expression (2a) (However, Matrix A becomes eight-line and eight sequences, and Matrix B becomes eight-line and one sequence.), and in accordance with the theory of the optimal regulator, the gain matrix K which makes the magnitude of the state variable vector converged into 0 can be determined. The actual vibration damping control is performed similarly to the case of FIG. 3(A).

Computation of a Wheel Torque Estimated Value

Figure 5:
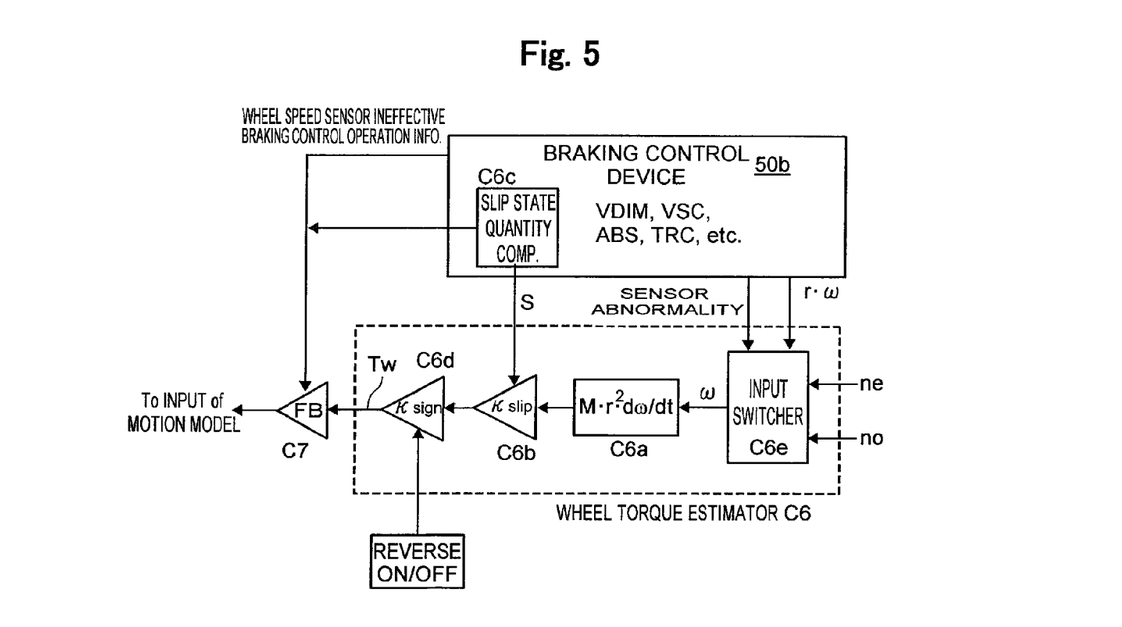
FIG. 5 is a drawing showing a structure of a wheel torque estimator in the form of a control block diagram. The structures of C6a-C6e may be constructed apart from a driving control device or a braking control device.

In the feedback control portion of the vibration damping controller of FIG. 2 (B), although it would be ideal to actually detect the wheel torque to be inputted into the feedforward control portion as a disturbance with a torque sensor installed at each wheel, it is difficult to provide a torque sensor in each wheel of a usual vehicle as already described, and therefore, there is employed a wheel torque estimated value Tw, which is estimated with the wheel torque estimator C6 from any other value which can be detected in a running vehicle. FIG. 5 shows the structure and operation of the wheel torque estimator C6 in a form of control blocks.

Typically, the wheel torque estimated value Tw can be estimated with the time differential of a wheel rotational speed ω or a wheel speed value r·ω obtained from a wheel speed sensor of a driving wheel as:

$$Tw = M\cdot r^2\cdot d\omega/dt \tag{5}$$

(FIG. 5, C6a), where M is the mass of the vehicle and r is a wheel radius. [Supposing the total of the driving forces generated by the respective driving wheels on the ground contact sites on a road surface is equal to the whole driving force of the vehicle M·G (where G is an acceleration), a wheel torque Tw is given by:

$$Tw = M\cdot G\cdot r \tag{5a}.$$

Since the acceleration G of the vehicle is given from the differential value of the wheel speed r·ω as:

$$G = r\cdot d\omega/dt \tag{5b},$$

the wheel torque will be estimated as in the expression (5).]

In the estimation of a wheel torque as described above, when the tire of a driving wheel grips a road surface to generate a driving force during the running of the vehicle, it is expected that the expression (5) will be generally consistent with an actually generated wheel torque. However, when the road surface reaction force on the driving wheel increases and exceeds beyond the maximum friction circle, the tire will fall into a slip state (where the tire starts slipping), and then, the expression (5b) would become invalid, and the accuracy of the estimated value of the expression (5) would get worse. Furthermore, from a signal from a wheel speed sensor usually installed on a wheel except some of highly functionalized sensors, the magnitude of a rotational speed of a wheel is detectable, but, the information on whether the wheel is rolling forward or backward is unacquirable. Thus, considering that the vibration damping controller is usually constructed under the assumption that the vehicle moves forward, the inputting of the above-mentioned estimated value into the vibration damping controller as it is during the reverse traveling of the vehicles would cause the inputting to the vibration damping controller of the wheel torque in the direction opposite to the actual direction. Further, also when a wheel speed cannot be detected correctly, e.g. when a wheel speed sensor breaks down, the accuracy in the wheel torque estimated value of the expression (5) would also get worse. Then, in the present invention, in a condition where it is assumed as described above that the accuracy of the estimation of a wheel torque estimated value by the wheel torque estimator (C6) would get worse, the correction of a wheel torque estimated value is made as described in the followings.

Correction of a Wheel Torque Estimated Value 1

Figure 4:
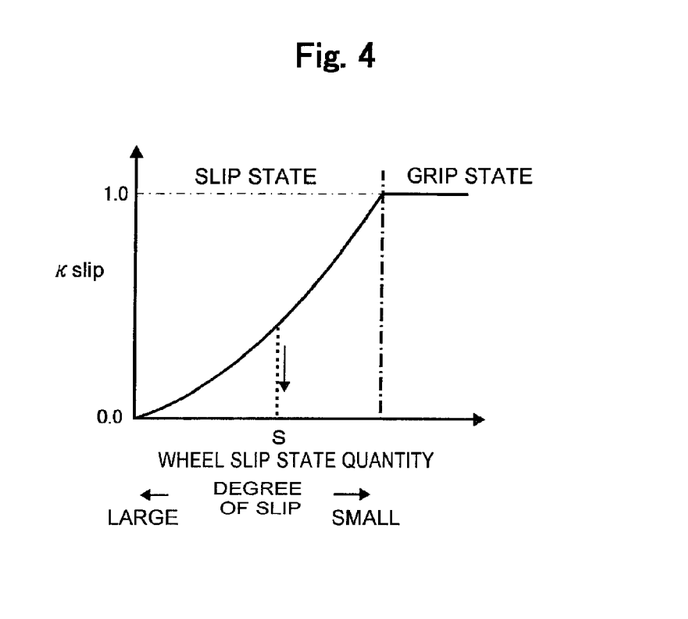
FIG. 4 shows a map in the form of a graph of a correction coefficient κslip for a wheel torque estimated value which varies depending upon a wheel slip state quantity.

When the tire of a driving wheel falls into a slip state, an acceleration value G, computed by the time differential of a wheel speed by the expression (5b), would become larger than an actual acceleration, and therefore, it is surmised that a wheel torque estimated value estimated from the wheel speed would become larger than an actual value. Thus, when the tire of a driving wheel falls in a slip state, a wheel torque estimated value is corrected downward based upon an arbitrary index value indicating a slip condition of the tire (wheel slip state quantity) (C6b). In this case, for example, the wheel torque estimated value of the expression (5) may be corrected into:

$$Tw = \kappa slip\cdot M\cdot r^2\cdot d\omega/dt \tag{6}$$

κslip is an amount given as a function of a wheel slip state quantity, and is given by using the map as shown in FIG. 4. In FIG. 4, it is important to note that, when a tire is in a grip state, κslip is set to κslip=1, and if the tire falls in a slip state and completely into the wheel spin condition (a condition that no wheel torque can be exerted on the vehicle), it is set to κslip=0.

The wheel slip state quantity, the index value showing a degree of a slip of a tire of a wheel, for instance, may be the ratio of the average of wheel speeds of the left and right driven wheels to the average of wheel speeds of the left and right driving wheels. In this case, when the driving wheel falls into a slip state, a wheel speed of a driving wheel will increase relatively, and, as a result, the ratio of a wheel speed, i.e., a wheel slip state quantity, will decrease. Also, a slip ratio or a ratio of slippages of tires may be used as the wheel slip state quantity. In this regard, when the wheel slip state quantity is defined as a value which increases while the degree of a slip becomes large, the value of κslip is reduced as the wheel slip state quantity increases, and as shown in the example of FIG. 4, when the wheel slip state quantity is defined as a value which reduces while the degree of a slip becomes large, the value of κslip should be reduced as the wheel slip state quantity decreases, and it should be understood that both of these cases belong to the scope of the present invention.

The correction of a wheel torque estimated value with κslip as in the expression (6) may be executed through monitoring the value of a wheel slip state quantity, but may also be executed based on the value of a wheel slip state quantity when the following condition (a)-(c) is established:
(a) When VSC, TRC, or ABS control is performed (When these controls are executed, usually, a tire changes its state from a grip state into a slip state.);
(b) When the difference between the average of the wheel speeds of the driven wheels and the average of the wheel speeds of the driving wheels exceeds a predetermined amount for a predetermined period;
(c) When the time differential value of a wheel speed exceeds a predetermined threshold for a predetermined period. In this regard, the predetermined threshold may be set to an acceleration which a vehicle cannot produce.

The slip state quantity computation portion (C6c) which executes the computation of a wheel slip state quantity, and the wheel torque correction portion (C6b) which executes the correction with κslip are realized by the operations of the CPU and other components. Although, preferably, the slip state quantity computation portion C6c is provided in the braking control device 50b, it may not be limited to this, and the portion C6c may be provided in the driving control device.

Correction of a Wheel Torque Estimated Value 2

As noted above, the direction of a wheel is undetectable in a normal wheel speed sensor, but, the estimated value, given through the estimation with the expression (5) in the wheel torque estimator, is computed under the assumption that the wheel is rolling forward. Thus, while the wheel is rolling backward, the sign of the estimated value will be opposite to that of the actual value. So, the inventive wheel torque estimator detects when the wheel is rolling backward from information other than a wheel speed sensor, and, if it is detected, the wheel torque estimator corrects the expression (5) into $$Tw=-M \cdot r^2 \cdot d\omega/dt \qquad (7),$$

and outputs the wheel torque estimated value (C6d).

The backward rolling of a wheel may be detected from e.g.
(d) that, for an automatic vehicle, a gearshift lever of the transmission is set into R range; and
(e) that, for a manual vehicle, a reverse switch is set to ON.

In this regard, in a case that a wheel speed sensor installed on a wheel is capable of detecting the rotational direction of the wheel, the expression (5) may be used while a wheel rotational speed ω is made into a negative value during the backward rolling of the wheel.

Correction of a Wheel Torque Estimated Value 3

If any abnormality occurs in a wheel speed sensor and the detection accuracy of a wheel speed gets worse, the accuracy of the wheel torque estimated value by the expression (5) also gets worse, and therefore, in such a case, the wheel rotational speed or the wheel speed of the driving wheel may be computed from the rotational speed of the driving device (See C6e in FIG. 5). When the rotational speed Ne of the output shaft of the engine or motor of the driving device is used, the wheel rotational speed of the driving wheel will be given by:

$$\omega e = Ne \times \text{a transmission(change gear)'s gear ratio} \times \text{a differential gear ratio} \qquad (8)$$

Further, when the rotational speed No of the output shaft of the transmission is used, it will be given by:

$$\omega o = No \times \text{a differential gear ratio} \qquad (9)$$

Then, the estimated value of the wheel rotational speed ω of the driving wheel in the expression (8) or (9) is substituted into the expression (5) (C6e→C6a), and thereby, the wheel torque estimated value will be computed.

The computation of the wheel torque estimated value by the expressions (8) or (9) may be executed, for instance, when either of the following conditions (f)-(i) is established:
(f) When an abnormality occurs in the signal of a wheel speed sensor and "abnormal condition" is judged;
(g) When an abnormality of a wheel speed sensor is judged in either of the other control devices, such as ABS, VSC, and TRC, or the braking control devices 50b (FIG. 1B);
(h) When the difference between the wheel speed computed from the signal of a wheel speed sensor and the wheel speed computed from the rotational speed of the output shaft of the driving device by the expression (8) exceeds a predetermined value for a predetermined period; and
(i) When the difference between the wheel speed computed from the signal of a wheel speed sensor and the wheel speed computed from the rotational speed of the output shaft of the transmission by the expression (9) exceeds a predetermined value for a predetermined period.

In this connection, in the present embodiment, any abnormality in a wheel speed sensor is detected in a well-known manner for a person skilled in the art as described above, and the signal indicating that will be transmitted from the braking control device 50b to the driving control device 50a.

Furthermore, it should be understood that the wheel torque estimator (C6) may be adapted so that all the above-mentioned corrections of the wheel torque estimated value may become executable (see FIG. 5). In such a case, the wheel torque estimated value of the expression (5) will be corrected as follows:

$$Tw=\kappa slip \cdot \kappa sign \cdot M \cdot r^2 \cdot d\omega/dt \qquad (10),$$

where κslip is usually κslip=1, and, when either of the above-mentioned conditions (a)-(c) is established, it is given from the map of FIG. 4 (C6b, C6c). κsign is usually κsign=1, and, when the above-mentioned condition (d) or (e) is established, it is changed into κsign=−1 (C6d). Furthermore, ω is usually a wheel rotational speed obtained from the signal of a wheel speed sensor, and, when either condition (f)-(i) is established, it is replaced by ωe or ωo given by the expression (8) or (9) (C6e). Accordingly, for example, when conditions (a), (d), and (f) are established, the wheel torque estimated value will be $$Tw=-\kappa slip \cdot M \cdot r^2 \cdot d\omega e/dt.$$

Correction of Vibration Damping Control

With respect to the above-mentioned calculation of a wheel torque estimated value, in a case that a wheel slip state quantity indicating a degree of a slip of a wheel is computed by the braking control device, such as ABS control, VSC, TRC, or VDIM, when these operations are forbidden, the wheel slip state quantity cannot be computed. In that case, Kslip of the expression (6) will not be computed, either. Thus, when the above-mentioned various controls cannot operate, the feedback gain FB of FIG. 2(B) is reduced or set into 0 so that the input value of the wheel torque estimated value Tw to the motion model C4 is reduced or interrupted. Concretely, the feedback control gain FB is reduced when either of the following conditions (j)-(l) is established:

(j) When all the ON-OFF switches for ABS control, VSC and TRC are turned into OFF;

(k) When the ON-OFF switch for VDIM is turned into OFF; and (l) When the operation of ABS control, VSC, TRC, or VDIM is forbidden due to any abnormality in the braking device.

In this regard, typically, the feedback control gain FB is set to FB=0 when either condition (j)-(l) is established, but, the possibility of occurrence of the slipping is low when a wheel speed is low, and therefore, as the wheel speed increases, the feedback gain FB may be reduced, e.g.

$$FB=\lambda/\omega \qquad (9),$$

where $\lambda$ is a positive constant to be determined experimentally or theoretically. In this case, if a wheel speed becomes high, the value of FB will be substantially set to 0.

On the other hand, in the correction of a controlled variable for the vibration damping control based on the requested driving torque converted from the driver's drive demand, namely, in the correction of a controlled variable by the feedforward control, the wheel torque estimated value is not used (because the motion model is a linear model), and therefore, the correction of a controlled variable by the feedforward control may be executed as it is even if either of the above-mentioned conditions of (j)-(l) is established. However, under a condition where it cannot be detected whether or not a wheel is in a slip state, if the wheel has fell into a slip state, the increase of the driving torque would make the slip condition get worse. Thus, the amplitude of a controlled variable for the vibration damping control may be reduced, or the vibration damping control itself may be stopped. For example, the amplitude of a controlled variable may be reduced as the magnitude of a wheel speed increases, similarly to the expression (9).

Moreover, in a case that it is judged that the accuracy of the wheel torque estimated value is not improved even by the execution of the corrections of a wheel torque estimated value 1-3 when neither of the above conditions (j)-(l) is established, the input of a wheel torque estimated value to the motion model C4 may be interrupted. Further, considering that the purpose of the inventive vibration damping control is directed for improvements in the driver's operational stability and the riding comfortableness of the vehicle, the conditions where the corrections of a wheel torque estimated value 1-3 are to be made, such as where a wheel falls into a slip state; where the vehicle is reverse-traveling; where any abnormality occurs in a wheel speed sensor, etc., are special conditions in the running of the vehicle, and, in some cases, any other control for stabilizing the running of the vehicle and/or ensuring its safety may be executed, and therefore, the input of the wheel torque estimated value to the motion model C4 may be interrupted. Accordingly, in the control structure of FIG. 2(B), when a condition of (a)-(i) is established, the input of a wheel torque estimated value to the motion model C4 may be interrupted. Further, in a case that a wheel falls in a slip state, when the degree of a slip indicated by a wheel slip state quantity is greater than a predetermined degree, e.g. when the wheel slip state quantity is below the predetermined value S in the map of FIG. 4, $\kappa$slip=0 may be set as shown by the dashed line, so that the input of the wheel torque estimated value to the motion model C4 may be substantially interrupted. Also, when a condition of (a)-(i) is established, the execution of vibration damping control may be stopped (the correction of a torque requested from a driver may be stopped) by putting U(t)=0.

Although the above explanation has been described with respect to embodiments of the present invention, it will be apparent for those skilled in the art that various modifications and changes are possible, and that the present invention is not limited to the above-illustrated embodiments and may be applied to various devices and apparatus without deviating from the concepts of the present invention.

For instance, although the wheel torque estimator (estimating device) is incorporated in the vibration damping controller in the above-mentioned embodiment, a wheel torque estimating device may be constructed as an independent unit. Further, although the wheel torque estimator has been explained so as to estimate the wheel torque of the driving wheel during the driving of the vehicle in the above-mentioned embodiment, the wheel torque estimated value of each wheel estimated from the corresponding wheel speed may be corrected for estimating wheel torques of a driving wheel and a driven wheel during its braking according to the wheel slip state quantity or whether or not the wheel is rolling backward, and such cases also belong to the scope of the present invention.

Moreover, although the wheel torque estimated value in the above-mentioned embodiment is estimated from a wheel speed, the wheel torque estimated value may be those to be estimated from a parameter other than a wheel speed and also having a possibility that its estimated value and its actual value can deviate from one another during the slipping of a wheel or during backward rolling of a wheel.

Furthermore, although the vibration damping control in the above-described embodiment is a vibration damping control in which the sprung mass motion model or sprung mass and unsprung mass motion model is assumed for the motion model to be used and the theory of the optimal regulator is used, the concept of the present invention may be applied for controls performing vibration damping while using any motion model other than those being introduced here and/or control methods other than the optimal regulator, if utilizing a wheel torque estimated value, and such cases are included within the scope of the present invention.

The invention claimed is:

1. A vibration damping control device of a vehicle suppressing pitching or bouncing vibration of the vehicle by controlling a drive output of the vehicle, the device comprising a wheel torque estimated value acquisition portion which acquires an estimated value of a wheel torque generated on a ground contact site of a wheel of the vehicle and a road surface and acting on the wheel; and a driving torque control portion which controls a driving torque of the vehicle to suppress pitching or bouncing vibrational amplitudes based on the wheel torque estimated value; wherein a slip state quantity acquisition portion which acquires a wheel slip state quantity indicating a slip condition of the wheel is provided, and an absolute value of the wheel torque estimated value or an absolute value of a controlled variable of the driving torque for the suppression of pitching or bouncing vibrational amplitudes is corrected to be smaller as a degree of a slip indicated by the wheel slip state quantity is larger.

2. The device of claim 1, wherein the wheel torque estimated value is made into a negative value when the wheel is rolling backward.

3. The device of claim 1, wherein the wheel slip state quantity is a ratio of a wheel speed of a driving wheel of the vehicle and a wheel speed of a driven wheel of the vehicle.

4. The device of claim 1, wherein the wheel torque estimated value is a function of a differential value of a wheel speed detected with a wheel speed sensor of a driving wheel of the vehicle.

5. The device of claim 1, wherein the wheel torque estimated value is a value estimated based on a wheel speed detected with a wheel speed sensor of a driving wheel of the vehicle, and the wheel torque estimated value is a value estimated based on a rotational speed of an output shaft of a driving device of the vehicle when the wheel speed sensor returns no results or abnormal result.

6. The device of claim 1, wherein the wheel torque estimated value is a value estimated based on a wheel speed detected with a wheel speed sensor of a driving wheel of the vehicle, and the control of the driving torque based on the wheel torque estimated value is stopped when the wheel speed sensor returns no results or abnormal result.

7. A vibration damping control device of a vehicle suppressing pitching or bouncing vibration of the vehicle by controlling a drive output of the vehicle, the device comprising a wheel torque estimated value acquisition portion which acquires an estimated value of a wheel torque generated on a ground contact site of a wheel of the vehicle and a road surface and acting on the wheel; the wheel torque estimated value being estimated based on a wheel speed detected by a wheel speed sensor of the wheel; and a driving torque control portion which controls a driving torque of the vehicle to suppress pitching or bouncing vibrational amplitudes based on the wheel torque estimated value; wherein the device controls the driving torque of the vehicle while assuming that wheel torque estimated value is a negative value when the vehicle is reverse-traveling.

8. The device of claim 7, wherein the wheel torque estimated value is a value estimated based on a wheel speed detected with a wheel speed sensor of a driving wheel of the vehicle, and the wheel torque estimated value is a value estimated based on a rotational speed of an output shaft of a driving device of the vehicle when the wheel speed sensor returns no results or abnormal result.

9. The device of claim 7, wherein the wheel torque estimated value is a value estimated based on a wheel speed detected with a wheel speed sensor of a driving wheel of the vehicle, and the control of the driving torque based on the wheel torque estimated value is stopped when the wheel speed sensor returns no results or abnormal result.

10. A vibration damping control device of a vehicle suppressing pitching or bouncing vibration of the vehicle by controlling a drive output of the vehicle, the device comprising a wheel torque estimated value acquisition portion which acquires an estimated value of a wheel torque generated on a ground contact site of a wheel of the vehicle and a road surface and acting on the wheel; and a driving torque control portion which controls a driving torque of the vehicle to suppress pitching or bouncing vibrational amplitudes based on the wheel torque estimated value; wherein the control of the driving torque based on the wheel torque estimated value is stopped when a degree of slipping expressed by a wheel slip state quantity indicating a slip condition of the wheel is greater than a predetermined degree or when the vehicle is reverse-traveling.

11. A vibration damping control device of a vehicle suppressing pitching or bouncing vibration of the vehicle by controlling a drive output of the vehicles, the device comprising a wheel torque estimated value acquisition portion which acquires an estimated value of a wheel torque generated on a ground contact site of a wheel of the vehicle and a road surface and acting on the wheel; a driving torque control portion which controls a driving torque of the vehicle to suppress pitching or bouncing vibrational amplitudes based on the wheel torque estimated value; and a slip state quantity acquisition portion which acquires a wheel slip state quantity indicating a slip condition of the wheel from a braking control device of the vehicle for reducing a slip of the wheel; and the device correcting a controlled variable of the driving torque based on the degree of a slip expressed by the wheel slip state quantity, wherein the controlled variable of the driving torque is reduced when the braking control device is inoperable as compared with when the braking control device is operable.

12. The device of claim 11, wherein the controlled variable of the driving torque of the driving torque control portion is determined based on the wheel torque estimated value and a requested driving amount by a driver of the vehicle, and the controlled variable of the driving torque based on the wheel torque estimated value is reduced substantially to 0 when the braking control device is inoperable.

13. The device of claim 11, wherein the braking control device is at least one chosen from a group consisting of an ABS control, VSC and TRC being made selectively operable by a driver of the vehicle; and the controlled variable of the driving torque is reduced when the braking control device is rendered inoperable by a selection of the driver as compared with when the braking control device is operable.

14. The device of claim 11, wherein the braking control device is a part of a VDIM being made selectively operable by a driver of the vehicle; and the controlled variable of the driving torque is reduced when the VDIM is rendered inoperable by a selection of the driver.

15. The device of claim 11, wherein the device reduces the controlled variable of the driving torque when the braking control device is inoperable owing to a braking device of the vehicle being abnormal as compared with when the braking control device is operable.

16. The device of claim 11, wherein the device is to correct an absolute value of the wheel torque estimated value or make the controlled variable of the driving torque smaller as a degree of a slip expressed by the wheel slip state quantity is larger.

17. A device for estimating a wheel torque acting between a wheel of a vehicle and a road surface, the device comprising: a torque estimating portion which estimates an estimated value of a wheel torque generated on a ground contact site of the wheel and the road surface and acting on the wheel; a slip state quantity computation portion which computes a wheel slip state quantity indicating a slip condition of the wheel; a wheel torque correction portion which corrects the wheel torque estimated value so that an absolute value of the wheel torque estimated value becomes smaller as a degree of a slip expressed by the wheel slip state quantity is larger.

18. The device of claim 17, wherein the device computes the wheel torque estimated value as a negative value when the wheel is rolling backward.

19. The device of claim 17, wherein the wheel slip state quantity is a ratio of a wheel speed of a driving wheel of the vehicle and a wheel speed of a driven wheel of the vehicle.

20. The device of claim 17, wherein the wheel torque estimated value is a function of a differential value of a wheel speed detected by a wheel speed sensor of a driving wheel of the vehicle.

21. A device for estimating a wheel torque acting between a wheel of a vehicle and a road surface, the device comprising a torque estimating portion which, based on a wheel speed detected by a wheel speed sensor of the wheel, estimates an estimated value of a wheel torque generated on a ground contact site of the wheel and the road surface and acting on the wheel; and a wheel torque correction portion which corrects the wheel torque estimated value to a negative value while the vehicle is reverse-traveling.

* * * * *